US010600246B2

(12) United States Patent
Cartwright et al.

(10) Patent No.: US 10,600,246 B2
(45) Date of Patent: Mar. 24, 2020

(54) PINNING VIRTUAL REALITY PASSTHROUGH REGIONS TO REAL-WORLD LOCATIONS

(71) Applicant: Microsoft Technology Licensing, LLC, Redmond, WA (US)

(72) Inventors: Luke Cartwright, Seattle, WA (US); Marcelo Alonso Mejia Cobo, Redmond, WA (US); Misbah Uraizee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/059,826

(22) Filed: Aug. 9, 2018

(65) Prior Publication Data

US 2019/0385368 A1 Dec. 19, 2019

Related U.S. Application Data

(60) Provisional application No. 62/685,788, filed on Jun. 15, 2018.

(51) Int. Cl.
*G06T 19/00* (2011.01)
*G02B 27/01* (2006.01)
*G06F 3/01* (2006.01)
*H04N 13/111* (2018.01)
*G06F 3/0346* (2013.01)

(52) U.S. Cl.
CPC .......... *G06T 19/003* (2013.01); *G02B 27/017* (2013.01); *G06F 3/011* (2013.01); *G06F 3/017* (2013.01); *H04N 13/111* (2018.05); *G06F 3/0346* (2013.01)

(58) Field of Classification Search
None
See application file for complete search history.

(56) References Cited

U.S. PATENT DOCUMENTS

| 2011/0164034 A1* | 7/2011 | Bennett | G06F 3/14 345/419 |
| 2014/0132484 A1* | 5/2014 | Pandey | G02B 27/0172 345/8 |
| 2016/0379413 A1 | 12/2016 | Yamamoto et al. | |
| 2017/0061696 A1 | 3/2017 | Li et al. | |
| 2017/0263056 A1 | 9/2017 | Leppanen et al. | |

(Continued)

FOREIGN PATENT DOCUMENTS

WO 2017139509 A1 8/2017

OTHER PUBLICATIONS

"International Search Report and Written Opinion Issued in PCT Application No. PCT/US2019/035913", dated Aug. 5, 2019, 15 pages.

*Primary Examiner* — Vu Nguyen
(74) *Attorney, Agent, or Firm* — Ray Quinney & Nebeker P.C.; Paul N. Taylor

(57) ABSTRACT

A method for presenting a physical environment in a virtual environment includes presenting a virtual environment to a user with a near-eye display, imaging a physical environment of the user, positioning a passthrough portal in the virtual environment, fixing a position of the passthrough portal in the virtual environment relative to the physical environment, and presenting a video feed of the physical environment in the passthrough portal in the virtual environment.

20 Claims, 6 Drawing Sheets

(56) References Cited

U.S. PATENT DOCUMENTS

2017/0287215 A1\* 10/2017 Lalonde ................ G06T 19/006
2018/0098059 A1\* 4/2018 Valdivia ................. H04L 51/16
2019/0213793 A1 7/2019 Balan et al.

\* cited by examiner

PINNING VIRTUAL REALITY PASSTHROUGH REGIONS TO REAL-WORLD LOCATIONS

CROSS-REFERENCE TO RELATED APPLICATIONS

This application claims the benefit of and priority to U.S. Provisional Patent Application No. 62/685,788, filed on Jun. 15, 2018, which is hereby incorporated by reference in its entirety.

BACKGROUND

Background and Relevant Art

With emerging ubiquitous user interfaces (UI), such as smart devices and innovative head-mounted display technology, usage of such UIs becomes more common among non-specialists. Opaque head-mounted displays (HMDs), such as virtual and mixed reality HMDs, obscure a user's vision and replace a view of the physical environment with a displayed virtual environment presented on the near-eye displays of the HMD. While the presentation of a virtual environment allows for flexibility in the work or leisure environment of a user, some users prefer to maintain awareness of the physical environment during use. Therefore, the replacement of the physical environment with the virtual environment by an opaque head-mounted display remains a barrier to adoption of the technology.

BRIEF SUMMARY

In some embodiments, a method for presenting a physical environment in a virtual environment includes presenting a virtual environment to a user with a near-eye display, imaging a physical environment of the user, positioning a passthrough portal in the virtual environment, fixing a position of the passthrough portal in the virtual environment relative to the physical environment, and presenting a video feed of the physical environment in the passthrough portal in the virtual environment.

In some embodiments, a system for presenting visual information to a user includes a near-eye display, at least one outward facing camera, an input device, a processor in data communication with the near-eye display and the outward facing camera, and a hardware storage device in data communication with the processor. The hardware storage device has instructions stored thereon that, when executed by the processor, cause the system to present a virtual environment to a user, image a physical environment of the user, position a passthrough portal in the virtual environment upon receiving an input from the input device, fix a position of the passthrough portal in the virtual environment relative to the physical environment, and present a video feed of the physical environment in the passthrough portal of the virtual environment.

In some embodiments, a method for presenting a physical environment in a virtual environment includes presenting a virtual environment to a user with a head mounted display (HMD), imaging a physical environment of the user with a camera of the HMD, positioning a passthrough portal in the virtual environment using an input device in data communication with the HMD, fixing a position of the passthrough portal in the virtual environment relative to the physical environment, and presenting a video feed of the physical environment in the passthrough portal in the virtual environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for presentation of part of a physical environment in a virtual environment. More specifically, the present disclosure relates to improving user experience with a virtual environment by allowing the user to receive visual information of the physical environment in a natural and intuitive manner in the virtual environment. In some embodiments, visual information may be provided to a user by a near-eye display. A near-eye display may be any display that is positioned near a user's eye, such as a liquid crystal display (LCD), light-emitting diode (LED) display, organic LED display, microelectromechanical system (MEMS) display, waveguide, or other device for directing light to a user.

In some embodiments, a virtual reality or mixed reality device may be a head-mounted display (HMD) that presents visual information to the user. An opaque near-eye display or head-mounted display (HMD) replaces the user's view of their surroundings. For example, the visual information from the HMD may be present on an opaque near-eye display or presented on a near-eye display in an opaque housing.

Visual information including virtual environments may be positioned in the user's field of view on the near-eye display. However, a user may choose to view the physical environment within the virtual environment by positioning a passthrough portal in the virtual environment that presents a video feed of the physical environment such that a user may maintain awareness of the physical environment while viewing the virtual environment presented by the opaque HMD. The passthrough portal may persist in the virtual environment as the user interacts with the virtual environment and/or moves relative to the virtual environment.

Figure 1:
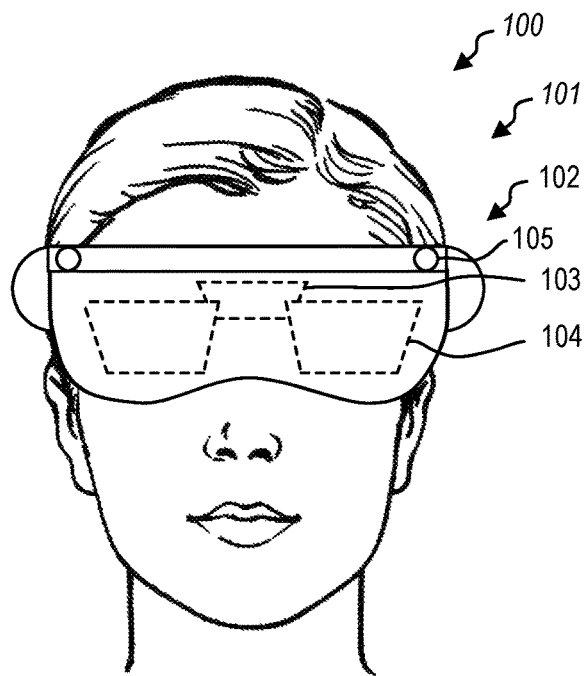
FIG. 1 is a perspective view of a head-mounted display (HMD) including a waveguide, according to at least one embodiment of the present disclosure.

FIG. 1 is a front view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be in communication with a near-eye display 104 to provide visual information to the near-eye display 104, which may, in turn, be presented in the user's field of view by the near-eye display 104.

In other embodiments, the HMD 101 includes one or more audio devices, cameras, display devices, communication devices, or other components in communication with one or more processors, storage devices, communication devices, or other computing components. For example, the HMD 101 may be in data communication with a computing device such as a laptop, desktop computer, or other computing device that renders a virtual environment and provides the information to the HMD 101 to display to the user.

In some embodiments, the HMD 101 may have a near-eye display 104 positioned near the user 100 to direct visual information to the user 100. The HMD 101 may include a single near-eye display 104, a separate near-eye display 104 for each of the user's eyes (i.e., two near-eye displays 104), or more than two near-eye displays 104 to provide visual information over a larger field of view.

In some embodiments, the HMD 101 may include one or more outward facing cameras 105 that may image the user's physical environment. For example, the camera(s) 105 may include a visible light camera(s) 105 that may image the surrounding environment. A processor may perform image recognition routines on the visible light image to detect and recognize elements in the surrounding environment, such as physical objects or people. In other examples, the camera(s) 105 may include depth-sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may include gesture recognition cameras that allow the HMD 101 to recognize and interpret hand gestures performed by the user 100 in front of the HMD 101.

Figure 2:
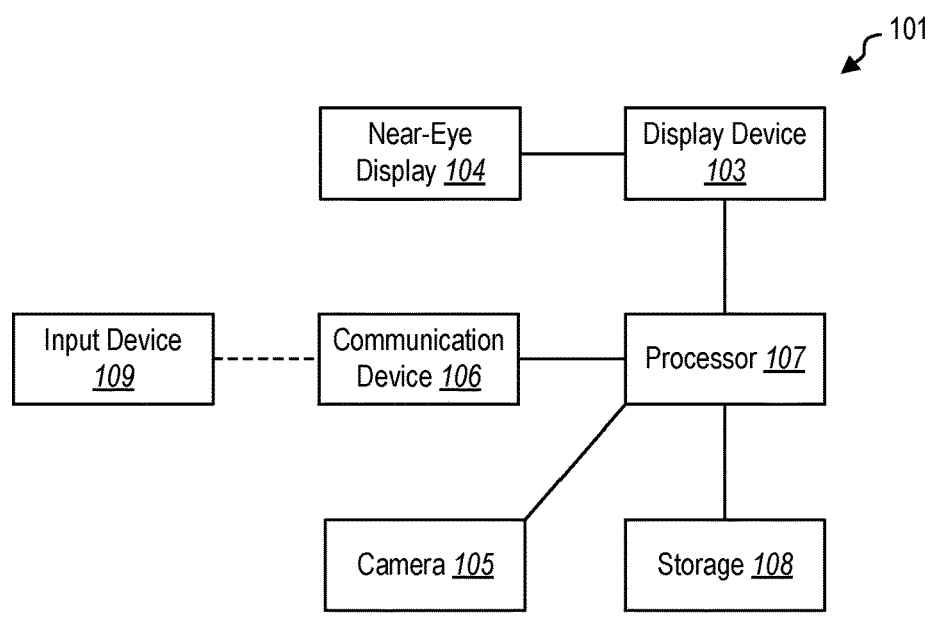
FIG. 2 is a schematic representation of the HMD of FIG. 1, according to at least one embodiment of the present disclosure.

FIG. 2 is a schematic representation of the HMD 101. The display device 103 in communication with the near-eye display 104 may be in data communication with a processor 107. Similarly, the camera 105 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 may have instructions stored thereon to perform one or more methods or portions of a method described herein. The processor 107 may further be in communication with a communication device 106, including a wired or wireless communication device, that communicates with one or more input devices 109 that allow a user to interact with the virtual environment presented by the HMD 101. In some examples, the input device 109 may include a mouse, a keyboard, a trackpad or other touch-sensing device, a multi-touch controller, a voice recognition device, a gesture recognition device, a gaze-tracking device such as an eye-tracking or head-tracking device, a motion controller such as 3-degree-of-freedom (3DOF) controller or a 6-degree-of-freedom (6DOF) controller, another peripheral controller, a smartphone or other handheld electronic device, or another device configured to interpret inputs from the user and communicate the inputs to the processor 107. The input device 109 is illustrated herein as a 6DOF controller. In some examples, a smartphone or other handheld electronic device may communicate with the HMD 101 an input device 109 including one or more accelerometers, gyroscopes, touch-sensing surfaces, multitouch surfaces, or other sensors to provide 3DOF, 6DOF, or other input information.

Figure 3:
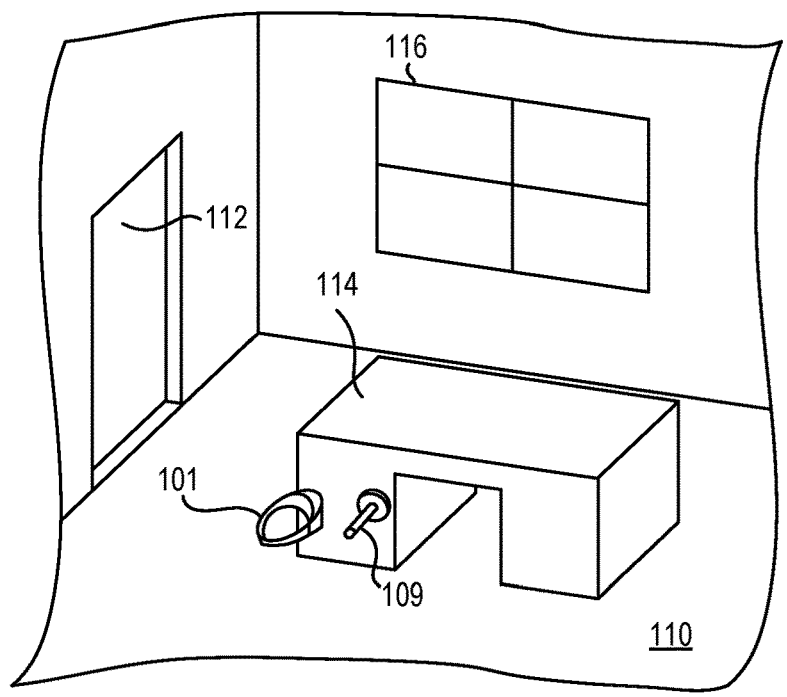
FIG. 3 is a perspective view of a HMD in a physical environment, according to at least one embodiment of the present disclosure.

FIG. 3 is a perspective view of an example physical environment 110 in which a user uses a HMD 101 and input device 109. The physical environment 110 may include a plurality of physical objects, such as a door 112, a desk 114, a window 116, or other physical objects of which a user may want to maintain awareness while using the HMD 101 and input device 109. For example, the user may use the HMD 101 and input device 109 while working at a desk 114, but the user may desire to be able to view any coworkers or other individuals that approach the door 112. Additionally, the user may move around the physical environment 110 while using the HMD 101 and input device 109, and the user may want to maintain awareness of papers or other objects on a surface of the desk 114 while wearing the HMD 101.

Figure 4:
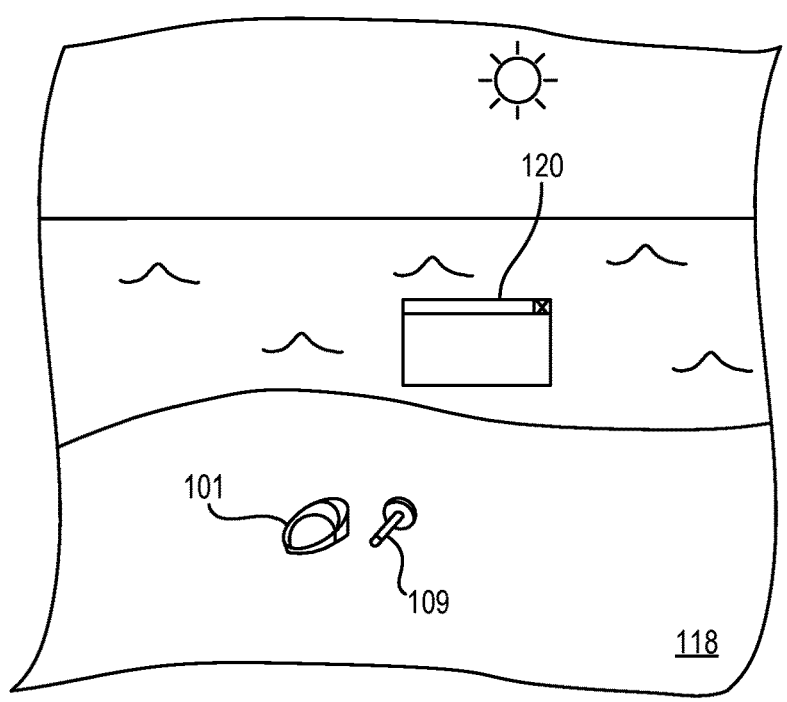
FIG. 4 is a schematic representation of a virtual environment presented by the HMD, according to at least one embodiment of the present disclosure.

While using the HMD 101 in the physical environment 110, a user may experience a virtual environment 118, as shown in FIG. 4. The virtual environment 118 may include one or more virtual elements 120. For example, an application virtual element 120 may be presented to the user in the virtual environment 118. The virtual environment 118, itself, may be a remote location different from the physical environment 110. In FIG. 4, the virtual environment 118 is a beach, at which an application virtual element 120 is presented hovering above the beach. The user may use the input device 109 to interact with the virtual environment 118 and/or the virtual elements 120 of the virtual environment 118. In a conventional HMD 101 and virtual environment 118, the virtual environment 118 replaces the physical environment 110 of FIG. 3, and the user may lack awareness of objects or people in the physical environment 110.

Figure 5:
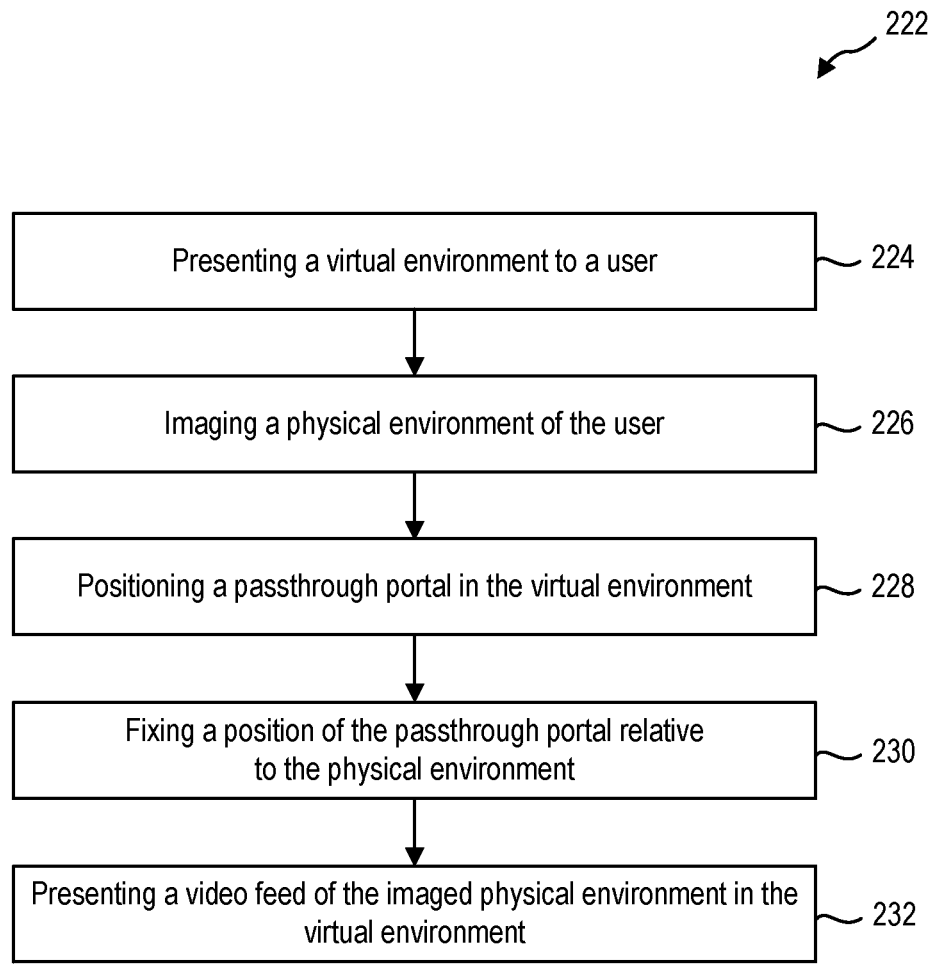
FIG. 5 is a flowchart illustrating a method of presenting a physical environment to a user of a virtual environment, according to at least one embodiment of the present disclosure.

FIG. 5 is a flowchart illustrating a method 222 of presenting a portion of a physical environment in a virtual environment. The method 222 includes presenting a virtual environment to a user at 224. In some embodiments, the virtual environment may be a three-dimensional space generated by the HMD or other computing device in communication with the HMD. In other embodiments, the virtual environment may be part of a shared environment. For example, a mixed reality HMD may present a virtual environment in combination with a surface mesh measured from a surrounding physical environment of the user. In such embodiments, the HMD may measure the surrounding physical environment of the user using, for example, depth cameras on the HMD or other sensors to impart information of the surrounding physical environment into a virtual environment to create a shared environment. The HMD may then use the shared environment to position a virtual element in a virtual environment relative to a physical element of the surrounding physical environment.

While the present disclosure described interaction with the virtual environment through a HMD, it should be understood that in other embodiments, the virtual environment may be presented on another display, such as a laptop, tablet, desktop, large format, or other display in communication with a processor and/or a gaze-tracking device. For example, the methods and systems described herein may be applicable to a user interacting with a large format display on a wall of a conference room. The large-format display may present a virtual environment, while a portion of the virtual environment presents video information of a remote physical environment.

The method 222 includes imaging a physical environment of the user at 226. One or more cameras of the HMD may image the physical environment in real time. For example, the cameras may be full color cameras of the visible light spectrum. In other examples, the camera may be a monochromatic camera that measures brightness of one wavelength (or a range of wavelengths) of light. In at least one example, the camera may be an actively illuminated camera that measures a reflected portion of a light provided by an illuminator on the HMD. For example, the camera may be an infrared camera and the HMD may include an infrared illuminator. The infrared camera may measure infrared light reflected to the camera, allowing the HMD to image the physical environment in low light situations without introducing visible light that may disturb other individuals near the user.

The method 222 further includes positioning a passthrough portal in the virtual environment at 228. The passthrough portal may be fixed in a position in the virtual environment relative to a position in the physical environment at 230 and the HMD then presents a video feed of the imaged physical environment in the virtual environment via the passthrough portal at 232. For example, the passthrough portal may be positioned in the virtual environment to allow the user to view a portion of the physical environment irrespective of the user's interactions with the virtual environment. The user may desire to maintain awareness of an object in or area of the physical environment while interacting with the virtual environment. Conventional passthrough video feeds provide a view of an outward facing camera of the HMD. The passthrough portal, however, remains fixed relative to the physical environment and unaffected by rotation or movement of the user's point-of-view (and hence the HMD).

In some embodiments, the passthrough portal may be positioned and fixed to a first position through a single interaction with the input device. For example, the user may point an input device at a location in the virtual environment and, through a single input, create and fix the passthrough portal. In other embodiments, the passthrough portal may be subsequently selected and moved to a second position in the virtual environment. The passthrough portal may then be fixed in the second position.

In some embodiments, the camera used to provide the video feed at 232 is the same as the camera used to image the physical environment at 226. For example, the camera may be a visible light camera that images the physical environment and is capable of full motion video. In other embodiments, a depth camera may image the physical environment at 226 and a visible light camera may capture the video feed.

In some examples, the cameras of the HMD may image the physical environment with a field-of-view (FOV) that is at least as large as the FOV of the virtual environment presented to the user by the near-eye display of the HMD. In such examples, whenever the passthrough portal is visible in the FOV of the virtual environment presented to the user, the region of the physical environment that is encompassed by the passthrough portal may be within the FOV of the cameras imaging the physical environment. Therefore, the portion of the video feed of the cameras of the HMD corresponding to the position of the passthrough portal may be displayed in the passthrough portal, allowing the user to maintain awareness of that region of the physical environment by looking at the passthrough portal.

Figure 6:
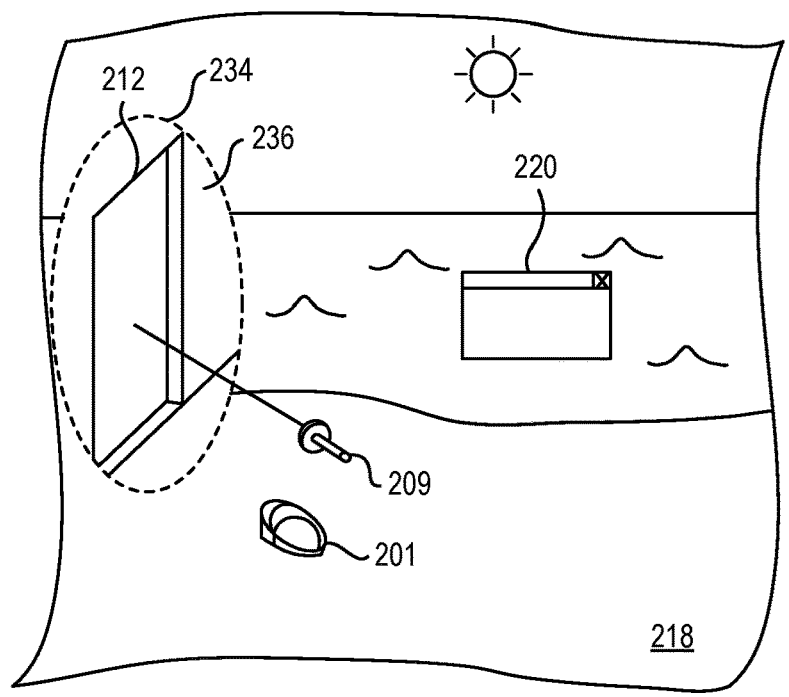
FIG. 6 is a schematic representation of the virtual environment of FIG. 4 with a passthrough portal to the physical environment of FIG. 3.

FIG. 6 through FIG. 10 illustrate examples of passthrough portals according to the present disclosure. FIG. 6 is a schematic view of a virtual environment 218 presented to a user on a HMD 201. The user may interact with the virtual environment 218 and/or virtual elements 220 with an input device 209. The user may position a passthrough portal 234 with the input device 209 at a location within the virtual environment. The passthrough portal 234 may have a video feed 236 of a portion of the imaged physical environment displayed therein. For example, the HMD may image a FOV of the physical environment that corresponds to the FOV of the virtual environment 218 presented to the user, and only the portion of the video feed of the physical environment that corresponds to the location, size, and shape of the passthrough portal 234 may be shown in the video feed 236 of the passthrough portal 234. In the illustrated example, the passthrough portal 234 is positioned and sized to provide a video feed 236 of the door 212 of the user's office.

The user may then interact with the virtual environment to move the virtual environment relative to the user's point of view (POV), for example, to "walk along the beach" of the virtual environment, with the passthrough portal 234 remaining fixed in location relative to the physical environment. Therefore, the passthrough portal 234 may be unaffected by movement of the user in the virtual environment.

In other examples, at least a portion of the movement of the user in the virtual environment may be movement of the user in the physical environment. For example, one or more sensors may detect movement of the HMD in the physical environment, and the perspective of the virtual environment provided to the user in the HMD may update to simulate movement in the virtual environment based on the movement in the physical environment. In such examples, the position of the passthrough portal 234 may remain fixed relative to the physical environment and/or the virtual environment 218 when the user moves relative to the physical environment.

Figure 7:
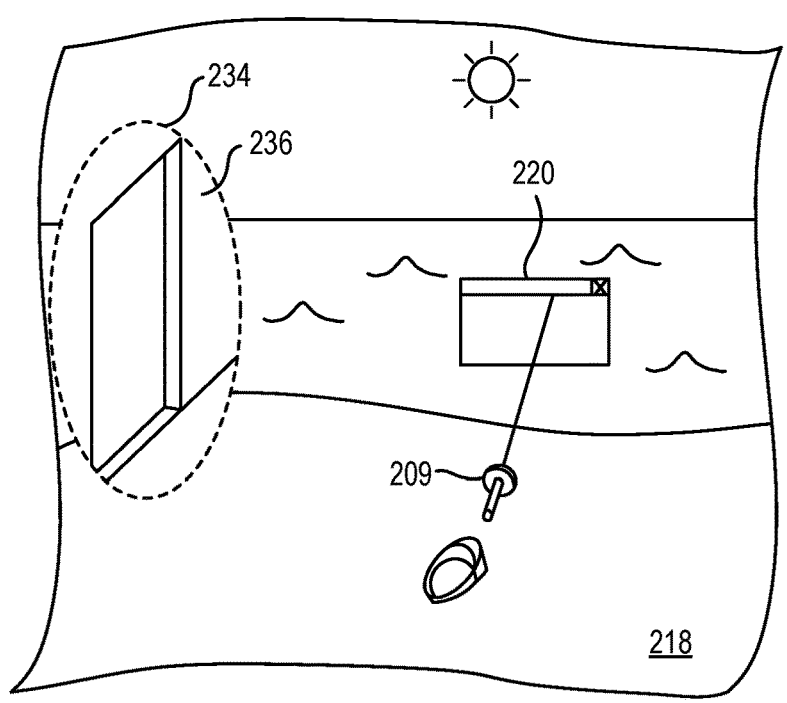
FIG. 7 is a schematic representation of the virtual environment of FIG. 6 as the user interacts with the virtual environment, according to at least one embodiment of the present disclosure.

FIG. 7 illustrates an example of an input device 209 interacting with a virtual element 220 of the virtual environment 218 while the passthrough portal 234 is active. The passthrough portal 234 may provide a continuous video feed 236 of the physical environment while the user is interacting with other virtual elements 220. For example, the user may use the input device 209 to move a virtual element 220 within the virtual environment 218.

Figure 8:
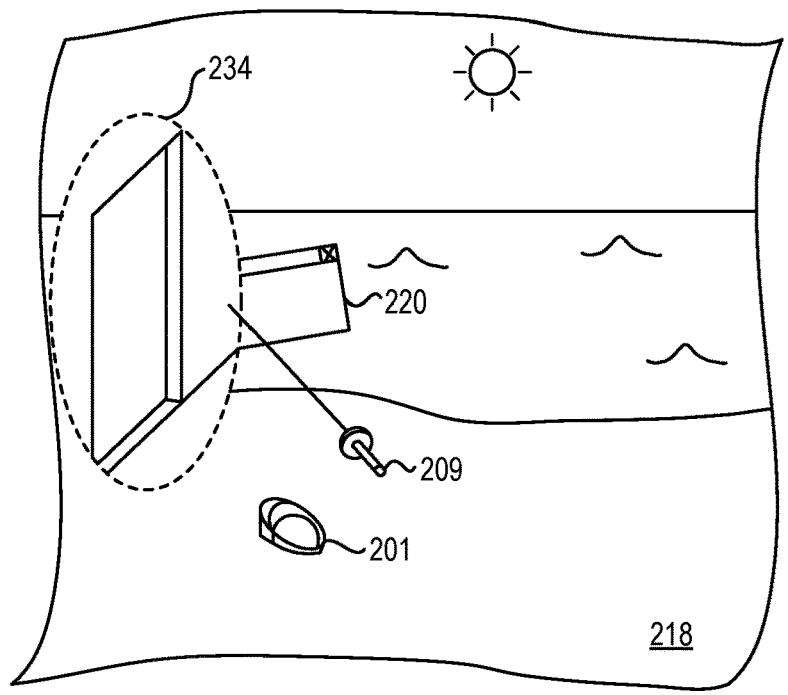
FIG. 8 is a schematic representation of a passthrough portal persisting in a virtual environment as the user interacts with the virtual environment, according to at least one embodiment of the present disclosure.
Figure 9:
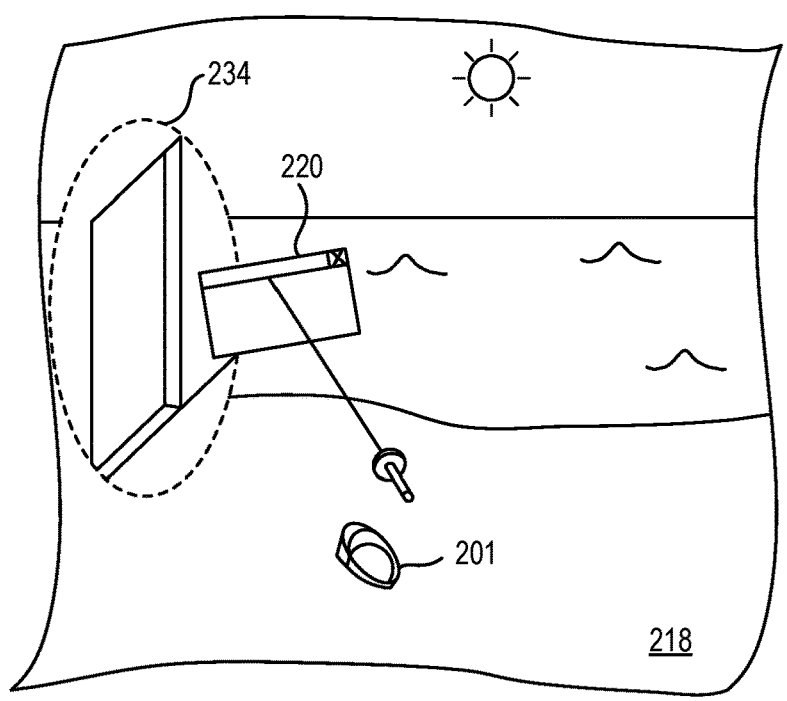
FIG. 9 is a schematic representation of the virtual environment of FIG. 8 with a virtual element positioned between a user and the passthrough portal, according to at least one embodiment of the present disclosure.

The passthrough portal 234 is presented as an element in the virtual environment 218. For example, a user may walk in the physical environment "behind" the passthrough portal 234. In other embodiments, the passthrough portal 234 may interact with or be positioned relative to other virtual elements 220. FIG. 8 illustrates a user moving the virtual element 220 behind the passthrough portal 234, with the passthrough portal 234 obscuring the presentation of the virtual element 220 to the user (represented by the HMD 201), as the passthrough portal 234 is, itself, an element within the virtual environment 218. FIG. 9 illustrates an example of a user moving the virtual element 220 between the user (represented by the HMD 201) and the passthrough portal 234.

In some embodiments, the position of the passthrough portal 234 is fixed relative to the physical environment, while the orientation of the passthrough portal 234 is relative to the POV of the HMD 201. For example, a centerpoint of the passthrough portal 234 may remain in a fixed position relative to the physical environment while the passthrough portal 234 is oriented normal to a ray cast from the POV of the HMD 201 in the virtual environment 218. In yet other embodiments, the position of the passthrough portal 234 is fixed relative to the physical environment, while the size of the passthrough portal 234 is relative to the POV of the HMD 201. For example, a centerpoint of the passthrough portal 234 may remain in a fixed position relative to the physical environment while the passthrough portal 234 is scaled relative to a distance from the POV of the HMD 201 to the passthrough portal 234 in the virtual environment 218.

Figure 10:
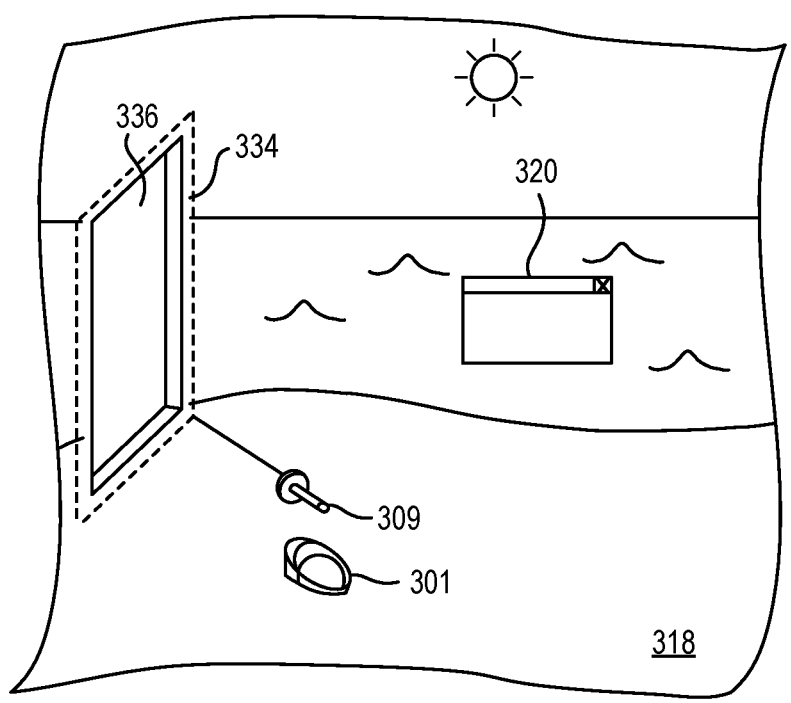
FIG. 10 is a schematic representation of a virtual environment as the user resizes and reshapes a passthrough portal, according to at least one embodiment of the present disclosure.

The passthrough portal 234, while illustrated in FIG. 9 as an ellipsoid shape, may have any shape. For example, the passthrough portal 234 may be a circle, a rectangle, a triangle, an ellipse, any regular polygon, irregular shape, or combinations thereof. For example, FIG. 10 illustrates an embodiment of a passthrough portal 334 that is a rectangle and may be resized. For example, a user can resize and/or reshape the passthrough portal 334 with the input device 309 to present a video feed 336 of only the desired portion of the physical environment. As such, the passthrough portal 334 may occupy less of the virtual environment 318, allowing more space for interaction with virtual elements 320 while retaining the awareness of the physical environment the user wants.

In some embodiments, the passthrough portal 334 may be automatically resized and/or reshaped without resizing or reshaping inputs from the user. For example, the camera(s) of the HMD 301 may image the physical environment and the processor may detect edges within the imaged physical environment. In at least one example, the processor may perform an edge detection function on the imaged physical environment by measuring areas of high contrast changes in the imaged physical environment. In other examples, the camera(s) may include a depth camera, and the processor may perform an edge detection function on the imaged physical environment by measuring areas of high depth changes in the imaged physical environment. The identified edges can be used to identify surfaces or features of the physical environment, such as a surface of a desk, a window, or a doorframe. The passthrough portal may be automatically resized and reshaped to "snap" to the identified surfaces or features and provide the user with a window to that feature of the physical environment.

The passthrough portal may be created in the virtual environment at a shell level in the graphics pipeline or other processing or rendering pipeline. For example, the user may create, position, reshape, and resize the passthrough portal independently of any applications or virtual environment generated by the HMD or computing device in communication with the HMD. For example, the passthrough portal may persist as the user opens, closes, or changes applications. The passthrough portal may persist at the system desktop with no applications running. In at least one embodiment, interacting with the passthrough portal may expand the passthrough portal to the user's full FOV in the near-eye display, replicating a full field of vision while wearing the HMD. The expanded passthrough portal may be toggled between the passthrough portal element in the virtual environment and the full FOV to allow a user to maintain awareness of a region of the physical environment, such as a door or a desk; seamlessly transition to a full view of the physical environment to interact with the physical environment, as needed; and easily transition back to interacting with the virtual environment.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for presenting a physical environment in a virtual environment, the method comprising:
   presenting a virtual environment to a user with a near-eye display;
   imaging a physical environment of the user;
   positioning a passthrough portal in the virtual environment;
   fixing a position of the passthrough portal in the virtual environment relative to the physical environment; and
   presenting a video feed of the physical environment in the passthrough portal in the virtual environment; and
   changing an orientation of the passthrough portal relative to the physical environment as a point of view of the user changes relative to the physical environment.

2. The method of claim 1, imaging the physical environment including using a depth camera.

3. The method of claim 1, imaging the physical environment and presenting the video feed including using the same camera.

4. The method of claim 1, positioning the passthrough portal in the virtual environment including resizing the passthrough portal.

5. The method of claim 1, positioning the passthrough portal in the virtual environment including reshaping the passthrough portal.

6. The method of claim 1, presenting the video feed including presenting a portion of a field of view (FOV) of a camera imaging the physical environment.

7. The method of claim 1, further comprising expanding the video feed from the passthrough portal.

8. The method of claim 7, expanding the video feed including presenting a video feed of the physical environment with a full FOV of the near-eye display.

9. The method of claim 1, further comprising:
   identifying a feature of the physical environment; and
   positioning the passthrough portal including automatically resizing or reshaping the passthrough portal to the feature without resizing or reshaping inputs from the user.

10. A system for presenting visual information to a user, the system comprising:
    a near-eye display;
    at least one outward facing camera;
    an input device;
    a processor in data communication with the near-eye display and the outward facing camera; and
    a hardware storage device in data communication with the processor, the hardware storage device having instructions stored thereon that, when executed by the processor, cause the system to:
      present a virtual environment to a user,
      image a physical environment of the user,
      position a passthrough portal in the virtual environment upon receiving an input from the input device,
      fix a position of the passthrough portal in the virtual environment relative to the physical environment,
      present a video feed of the physical environment in the passthrough portal of the virtual environment; and
      change an orientation of the passthrough portal relative to the physical environment as a point of view of the user changes relative to the physical environment.

11. The system of claim 10, the input device being a 6-degree-of-freedom controller.

12. The system of claim 10, the input device being a gesture recognition device configured to recognize hand gestures of the user.

13. The system of claim 10, further comprising at least one sensor in data communication with the processor, the at least one sensor configured to measure movement of the near-eye display relative to the physical environment.

14. The system of claim 10, the instructions being executed at a shell level of the system.

15. A method for presenting a physical environment in a virtual environment, the method comprising:
    presenting a virtual environment to a user with a head mounted display (HMD);
    imaging a physical environment of the user with a camera of the HMD;
    positioning a passthrough portal in the virtual environment using an input device in data communication with the HMD;
    fixing a position of the passthrough portal in the virtual environment relative to the physical environment;
    presenting a video feed of the physical environment in the passthrough portal in the virtual environment; and
    changing an orientation of the passthrough portal relative to the physical environment as a point of view of the user changes relative to the physical environment.

16. The method of claim 15, fixing the position including fixing the passthrough portal at a first position, and further comprising moving the passthrough portal to a second position.

17. The method of claim 16, moving the passthrough portal to a second position including interacting with the passthrough portal with the input device.

18. The method of claim 15, identifying a feature of the physical environment and positioning the passthrough portal including automatically resizing or reshaping the passthrough portal to the feature without resizing or reshaping inputs from the user.

19. The method of claim 15, further comprising changing a size of the passthrough portal as a distance from the user to the passthrough portal changes.

20. The method of claim 15, fixing the position of the passthrough portal further comprising fixing a size and orientation of the passthrough portal.

\* \* \* \* \*